United States Patent Office 3,407,254
Patented Oct. 22, 1968

3,407,254
ANTIPERSPIRANT COMPOSITIONS AND METHOD FOR THEIR APPLICATION
Bernard Siegal, Berkeley Heights, Herbert H. Gary, Metuchen, and Chung Teck Shin, Hillside, N.J., assignors to Bristol-Myers Company, New York, N.Y., a corporation of Delaware
No Drawing. Filed July 24, 1964, Ser. No. 385,044
10 Claims. (Cl. 424—66)

This invention relates to perspiration retarding or inhibiting compositions and more particularly to compositions of this character which contain zirconium. It also relates to methods for inhibiting the flow of perspiration which utilizes said compositions. The term composition is used herein in its broad sense to include distinct chemical compounds or complexes, as well as mixtures of chemical compounds or complexes.

A variety of zirconium compounds have been suggested in the prior art for use as perspiration retarding or inhibiting compositions. These antiperspirants have generally been to acid in character or too low in activity. Thus, for example, zirconium salts of monobasic mineral acids have been known to be effective antiperspirants for a long time. However, they were not usable from a practical point of view because of their high irritation potential to skin and corrosive action on fabrics largely due to their extremely high acidity.

In an effort to avoid the high acidity of the mineral acid salts of zirconium, attempts have been made to utilize neutral or low acid compounds of zirconium. Thus, for example, it has been proposed to use neutralized zirconium lactate or zirconium carbonate. Although these compounds are low in acidity and irritation potential, they are, generally, ineffective or of a low order of activity.

It has also been proposed to use zirconium salts of monobasic mineral acids, together with basic aluminum chloride or together with basic aluminum chloride and a buffering agent, such as urea or glycine. These compositions introduced aluminum which, as will be shown in more detail below, is less effective than zirconium as an antiperspirant material.

I has now been found that high activity antiperspirants may be made which have a very low irritation potential to human skin and exhibit virtually no fabric damage by combining a zirconium salt with a nucleophilic compound and an amino acid compound, i.e., an amino acid or an amino acid derivative. This combination of materials is believed to form Werner type complexes which include zirconium, nucleophilic compound and amino acid compound.

It is accordingly an object of the present invention to provide an antiperspirant zirconium composition of low skin irritation potential and high antiperspirant activity.

It is a further object of the present invention to provide an antiperspirant composition comprising zirconium, a nucleophilic compound and an amino acid compound.

It is also an object of the present invention to provide an antiperspirant composition comprising, in the form of a Werner type complex, zirconium, a nucleophilic compound and an amino acid compound.

It is another object of the present invention to provide a composition of the type mentioned in the above objects in the form of a solution, cream, lotion or aerosol composition.

It is still another object of the present invention to provide methods for using and preparing the compositions of the above objects.

Other and more detailed objects will be apparent from the following description and claims.

The mechanism for the antiperspirant activity of such metals as zirconium, aluminum, etc. is widely believed as being one of precipitation or denaturation of protein caused by these metals in cationic form. The greater the cationic charge of the metal, the greater is the protein denaturation expected. It is therefore desirable from this point of view to have ion species present in the composition which are highest in cationic charge and which can exist at a pH which can be tolerated by skin and fabric, in sufficient concentration to function practically as antiperspirants.

Theoretically, on the basis of the above proposed mechanism, the most active antiperspirant zirconium ion species would be $Zr^{4+}$. This species of ion, however, can only exist in solutions at pH below 0.5.

As the pH rises above 0.5, progressively more $Zr^{4+}$ reacts with water in accordance with the folowing equilibrium reaction:

(1) $Zr^{4+} + (H_2O)_n \leftrightarrow [Zr=O(H_2O)_4]^{2+} + 2H^+ + (H_2O)_{n-5}$ The ion species $Zr=O^{2+}$ or its hydrated form as shown in Equation 1 are still very effective as an antiperspirant.

The ion species $ZrO^{+2}$ is known to exist in aqueous solution between a pH of .5 and about 3.5. At the lower end of this range, the ion is present in sufficient concentration to be effective as an antiperspirant. The latter, however, is too acid and accordingly has skin irritation and fabric damage potential. At the upper end of the range, and particularly at pH levels between 2.0 to 3.5 which are compatible with skin and fabric, ordinarily, precipitation of zirconium takes place in the form of the white insoluble $ZrO_2$. Thus, the neutralization of an aqueous solution of basic zirconium chloride with NaOH causes a precipitation of $ZrO_2$ at pH of about 2. As a result the concentration of the active ion species $[Zr=O^{2+}]$ (or its hydrated form) becomes too low to be effective.

I has now been found, in accordance with the present invention, that the incorporation of a nucleophilic agent and an amino acid compound into a solution containing a zirconium ion will prevent the precipitation of $ZrO_2$ at pH levels at the upper end of the pH range of from .5 to 3.5 and particularly, in the range of from 2.0 to 3.5. Moreover, there is thus also made available in solution the active ion species $Zr=O^{2+}$ in equilibrium with zirconium-nucleophile-amino acid compound complex (hereinafter referred to as Zr-N-A complex) in sufficient concentration as to serve as a very effective antiperspirant. As will be discussed in more detail below, this cannot be accomplished by the nucleophilic compound or the amino acid compound when they are used alone.

As used herein the term nucleophilic compound or agent designates an electron dense specie which tends to seek, find and stay near a cationic site. When used in connection with the present composition, it implies that these electron dense substances offer to share its electrons with the electron deficient cation for complex formation without any essential change in the existing or electrostatic character of the cation. Although the amino acids may qualify as nucleophiles under this definition, for the purposes of the present invention, amino acids are excluded from the definition of nucleophilic agents or compounds.

The Zr-N-A complexes formed in accordance with the present invention may (1) function as the effective antiperspirant agent per se, (2) serve as a reservoir for other active antiperspirant ion species, or (3) function in both these capacities. Moreover, the Zr-N-A complex can take a variety of forms and may be monomeric or polymeric in character.

The Zr-N-A complexes of this invention may be designated generally by the formula:

(2) $([R]_a[R']_b[ZrO][H_2O]_c)_n$ in which:
(1) R is a nucleophilic compound,
(2) R' is an amino acid compound,
(3) $n$ is a number of from 1 to 32 inclusive, and corresponds to the number of zirconium atoms in the molecules of the complex,
(4) $a$ is a number of from 1 to 5 inclusive,
(5) $b$ is a number of from 1 to 5 inclusive,
(6) $c$ is a number from 0 to 4 inclusive,
(7) $a+b+c$ has a value of from 2 to 6 inclusive, and
(8) wherein R, R', $H_2O$ and O, when present, are attached directly to Zr.

It will be noted that the complexes of the present invention are characterized by the fact that for each zirconium atom in the complex, there is also at least one amino acid ligand and one nucleophilic ligand, whereas the other ligands may or may not be present. It will also be noted that the maximum coordination number of zirconium is 8 and consequently the maximum number of ligands bonded to each zirconium atom will be 8. However, although the maximum coordination number of zirconium is 8, it more often exhibits a coordination number of 6 and below, and the sum of the ligands bonded to each zirconium atom accordingly will not exceed 6.

When the number of zirconium atoms in a molecule of the complex exceeds 1, i.e., $n$ is greater than 1 in Formula 2 above, the complex is polymeric in character, the zirconium atoms generally being bonded to each other through an oxygen bridge. In the case of the monomeric form of the complex only, one zirconium atom is generally present in the molecule. However, even in the monomeric form the number of the different types of ligands within the above definition that are present can vary.

It will also be appreciated that in any one composition of this invention, a mixture of complexes falling within the above definition may be present simultaneously. These may vary, for example, as to the degree of polymerization and relative number of each ligand that is present, etc.

To illustrate more specifically the type of complexes that are utilized in the present invention, mention may be made of a dimeric form of the complex which may be described by the following formula:

(3) 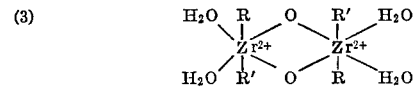

In this case R and R' have the same value ascribed to them above. Furthermore, the zirconium has a coordination number of 6 and also contains $H_2O$ and —O— ligands. This complex (Formula 3) in solution is believed to be in equilibrium with other ionic species in accordance with the following equation:

(4) 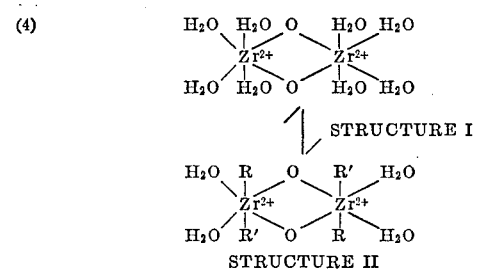

The belief in the structural configuration for the complex shown in "Structure II" above is based on some of the known coordinating characteristics of zirconium and certain chemical properties of the aqueous solution of the complex. Soluble zirconium salts in aqueous acid media most often exist as labile inner orbital complexes with coordination numbers of 6 (CN 6), in which the complexing ligands are water. Although the maximum coordination number for the zirconium (Zr) atom is 8, steric factors are generally unfavorable for maximum packing.

The addition of the nucleophile and an amino acid compound to the zirconium salt solution finds a favorable environment for the replacement of the water ligands. This occurs along the Z axis (perpendicular to the plane of the paper as shown in Equation 4 in a transreplacement, most likely, as a ($CN_2$) substitution nucleophilic bimolecular reaction where the approaching ligand causes the ejection of a water ($H_2O$) molecule. The Z axis is the least hindered site and thus, the most likely direction through which to approach.

The replacing nucleophile is coordinated by the extra electron pair of, for example, a nitrogen atom. However, this nitrogen-containing ligand is more polarizable than the water ligand it replaced and can be more easily utilized by the polarizing central Zr atom. This results in rapid ligand replacement but not without some excess distortion of its modified tetrahedral structure. Nevertheless, the complex can be said to be thermodynamically stable owing to the additional crystal field stabilization energy that is obtained by $d$ orbital splitting that occurs when Zr is surrounded by a nucleophilic nitrogen environment.

The fact that the addition of the nucleophile-amino acid compound combination to the zirconium salt solution results in more than a mere neutralization reaction (although such neutralization reaction is known to be a competing reaction that takes place to some extent) is evidenced by the fact that the resultant solution is not alkaline. The quantity of nucleophile-amino acid compound combination that is added to the zirconium salt solution is well in excess of that required to neutralize all of the hydrogen ions in solution. As a consequence, it would be expected that the pH of the resultant solution would be well on the alkaline side. The fact of the matter is, however, that the pH of the solution is well on the acid side ranging from about 2.0 to 3.5.

This may further be illustrated by a numerical example. An aqueous solution of a water-soluble zirconium salt, such as basic zirconyl chloride having a concentration of .800 mole/liter of zirconium salt would have a total $H^+$ concentration before addition of a buffering agent of 0.1 mole per liter. In the preparation of a typical composition of the present invention, the total molar amount of the combination of nucleophile-amino acid compound that is added in this case is equal to .46 mole/liter. This reacts with substantially all of the hydrogen ion present, the quantity neutralized being .099 mole/liter. The molar quantity of nucleophile-amino acid compound combination that still is available is therefore .46—.099 mole or .361 mole per liter. The presence of such a quantity of nucleophile-amino acid compound combination would ordinarily raise the pH well into the alkaline range. The fact that this doesn't happen is explained by the complex formation of "Structure II" shown above.

Further evidence for the formation of the complex is the fact that no free amino acid compound can be detected in these solutions by the ninhydrin test. This further indicates that the excess amino acid compound present must be bound in complex formation.

As noted above, a zirconium complex having the desired characteristics cannot be obtained with either the nucleophilic compound alone or with the amino acid compound alone. The reason for this is not entirely clear. It appears, however, that ligands of different sizes and electron densities present less steric and electron repulsion problems than those that are similar. Accordingly, complexes containing the mixed ligands of nucleophile and amino acid compounds are more readily formed than those which would contain only one or the other.

The complexes formed in accordance with the present invention allow zirconium to stay in solution in an active form, i.e., ionic state $Zr=O^{2+}$, at higher pH levels than was normally believed possible and prevents the precipitation of $ZrO_2$ which is the inactive form of zirconium. In this oxidation state, zirconium may exist in several ionic species as seen from Equation 4 above. It is believed, however, that the principal activity is due to the presence of "Structure I" and "Structure II" set forth in said equation.

As indicated above, the complexes of the present invention in solution are in equilibrium with other compounds and ion species. Although the various molar amounts of these compounds and ions can vary somewhat, at the desired pH, in the equilibrium shown in Equation 4 about 75% of the active Zr present exists as "Structure I" while the remainder exists as "Structure II."

The above can also be illustrated by a numerical example. In an aqueous system formed containing .800 mole/liter of zirconium salt and .46 mole/liter of the combination of nucleophile-amino acid compound, the approximate molar concentration of the various components of the system are shown in Table I below:

TABLE I

| | Ml. |
|---|---|
| (1) Total H+ concentration before the addition of nucleophile-amino acid compound combination | 0.1 |
| (2) Total nucleophile-amino acid compound combination added | 0.46 |
| (3) Concentration of H+ neutralized by addition of item 2 | 0.099 |
| (4) Zirconium salt present in solution | 0.800 |
| (5) Nucleophile-amino acid compound combination available for complexing at 2 moles/mole of Zr | 0.18 |
| (6) Concentration of complex formed (Structure II) | 0.18 |
| (7) Concentration of Zr as (Zr=O)²⁺ (Structure I) | 0.62 |

The advantage of the complex of this invention as illustrated in Equation 4 is that it continues to maintain an equilibrium with Structure I. As the latter is used up, more continues to form as a result of the equilibrium shift. The increase in pH resulting from additional Lewis acid neutralization by the freed nucleophilic ligands is counterbalanced by the formation of Structure I until all of the complex has been utilized.

This also explains the mechanism of this composition's unexpected but outstanding resistance to fabric damage. "Structure II," the complex, serves as a storage depot releasing the nucleophilic agents as it is being utilized. The resulting Lewis acid neutralization prevents the strong acid fabric destruction expected from the presence of a high concentration of active zirconium.

Another illustration of a type of complex embodied in the present invention may be described by the general formula:

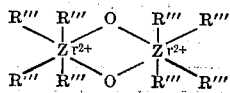

wherein R''' is selected from the group consisting of $H_2O$, amino acid compound and nucleophilic compound, at least one R''' group being an amino acid compound and at least one other R''' group being a nucleophilic compound.

A wide variety of zirconium salts may be used to prepare the compositions of the present invention. It is preferred, however, in general, to use soluble zirconium salts of, and particularly water-soluble zirconium salts of strong acids, e.g., mineral acids or any zirconium salt, such that in solution a concentration in excess of 1% exists as a cationic zirconium species. By way of illustration, the following zirconium salts may be used in accordance with the present invention: zirconium oxychloride, aceto zirconyl chloride, basic zirconium nitrate, basic zirconium bromide, zirconium oxy bromide, and basic zirconium perchlorate. The best results, however, have been obtained through the use of basic zirconium chloride and particularly basic zirconyl chloride available as a 5–35% $ZrO_2$ solution having a Cl/Zr ratio of from .5–1.5 and preferably a ratio of 1.

Any of a variety of nucleophilic compounds are suitable for use in accordance with the present invention. Thus, for example, water soluble amino, thio and oxy compounds have been found to be useful. However, weaker bases are generally preferred to the strong bases. The preferred nucleophile compounds are the water-soluble amines that have a water solubility of at least .1% in which the amino nitrogen is not sterically hindered to an extent which would prevent complex formation. Among the particular nucleophilic compounds that may be employed there may be mentioned: propylenediamine, triethylamine, diethylamine, monoethylamine, tri-ethylenetetramine, tetraethylpentamine, triisopropanolamine, 2-amino-1-methylpropanediol, trimethylolamine, triethanolamine, diethanolamine, monoethanolamine, thioethanolamine, thioglycolic acid, buffered acetic acid and buffered bromo acetic acid. Of this group the alkanolamines including the mono-, di- or trialkanolamines, and particularly triethanolamine have been found to be most suitable.

The amino acid compound, i.e., the amino acid or derivatives thereof, that can be used in the present invention can also be selected from a large variety of compounds.

In a preferred form of this invention the amino acid compound chosen would have the following characteristics:

(1) Soluble in water, e.g., 1% or greater.
(2) Isoelectric point at pH 4 or above,
(3) a $pk_{b1}$ between 5 and 12,
(4) Little or no steric hindrance about the functional amino group, and
(5) High electron density about the functional amino group.

Typical amino acid compounds of this character that may be mentioned are: lysine, glycine, valine, leucine, methionine, N-phenylalanine. The l form, d form or dl form of these compounds can be employed.

Among the group of amino acid compounds that are most suitable for the present purposes are the α amino fatty acids. This is best exemplified by glycine.

The compositions of the present invention may be made up in a variety of forms. Thus, it can comprise a simple aqueous solution containing the complex or may be incorporated in an aerosol container together with a propellant to be dispensed in the form of a fine spray. It may also be incorporated in a lotion, stick or a cream which also contains any of the usual components found in compositions of this character.

The compositions of the present invention are usually prepared by first preparing an aqueous solution of the active ingredients which can be used as such or further incorporated into another vehicle. Thus, aqueous solutions are prepared containing 5–15% by weight, and preferably 7–12% by weight of water-soluble zirconium salt and from 1–10% and preferably 3–6% by weight of the nucleophilic-amino acid compound combination. The nucleophilic component in these cases represent from .5 to 7.5% by weight of the total composition.

In one form of the invention the above aqueous composition is prepared by adding the nucleophilic agent to an aqueous solution containing the water-soluble zirconium salt which was previously heated. The nucleophilic agent is added to said zirconium salt solution while the latter is under continuous agitation. The temperature and agitation are maintained until a clear solution is obtained. The amino acid compound is then added to said clear solution, and it is maintained at the elevated temperature and under continuous agitation for an additional period of time until the reaction is complete.

To the aqueous solution described above, there may be added any of a variety of agents depending on the nature of the finished product desired. These may be thickening agents, emulsion stabilizers, emulsifiers, auxiliary emulsifiers, opacifiers, humectants, lubricants, emollients, perfumes, etc. or any combination thereof. Similarly, the active ingredients of the present invention may be incorporated into antiperspirant stick compositions. Suitable vehicles of this character are described in Sagarin "Cosmetics, Science and Technology," 1957 at page 730. Suitable liquid, cream and lotion bases wherein the active components of the present invention may be employed are also described in said Sagarin publication at pages 724–730.

Below are listed various specific examples of particular materials which can be used in formulating compositions that are encompassed within the present invention:

(a) Thickening agents—magnesium aluminum silicate, methylcellulose hydroxyethyl cellulose, polyvinyl alcohol, etc.

(b) Emulsifiers—polyoxyethylene ethers of lauryl, stearyl, or oleyl alcohols, etc.

(c) Emulsion stabilizers and auxiliary emulsifiers—acid stabilized glyceryl monostearate, stearyl alcohol, cetyl alcohol, etc.

(d) Opacifier—titanium dioxide, talc, etc.

(e) Humectants—glycerin, sorbitol, propylene glycol, etc.

(f) Lubricants—USP liquid petrolatum, fatty acid esters, such as isopropyl palmitate, isopropyl myristate, butyl stearate, etc.

(g) Emollients—lanolin, lanolin alcohols and esters, oleyl alcohol, etc.

(h) Perfume—oriental and fantasia.

The following examples are further illustrative of the present invention. It should be understood, however, that the invention is not limited thereto. Unless otherwise specified, the percentages refer to percentages by weight.

Example 1.—Aqueous solution of complex

| | Percent |
|---|---|
| Basic zirconium chloride (calculated as $ZrO_2$) | 10.0 |
| Triethanolamine 98% | 2.0 |
| Glycine | 2.5 |
| Water | 85.5 |

The basic zirconyl chloride is available as a 20% solution (as $ZrO_2$) having a Cl/Zr ratio of 1, and a pH range of 0.5–1.0. Triethanolamine (4% by weight) was added to 100 parts by weight of said basic zirconyl chloride solution, previously heated to 130° F. under continuous agitation. The elevated temperature and agitation were maintained for about 40 minutes or until the solution was clear. Glycine (5% by weight of the total composition) was added and the elevated temperature and agitation were for an additional 20 minutes.

Example 2.—Lotion

| | Percent |
|---|---|
| Magnesium aluminum silicate | 0.5 |
| Polyoxyethylene lauryl ethers | 3.5 |
| Acid stable glyceryl monostearate | 4.0 |
| Solution of Example 1 | 54.5 |
| Perfume, color, water, q.s. to | 100 |

(1) Disperse the magnesium aluminum silicate in all the available water at 185° F. for 30 minutes.

(2) Heat the polyoxyethylene lauryl ethers and acid stable glyceryl monostearate to a homogeneous melt at 185° F.

(3) Add No. 2 to No. 1 slowly and agitate for 15 minutes at the emulsion temperature (185° F.) before starting to cool.

(4) Add the solution of Example 1 at 130° F. and agitate for 20 minutes maintaining the temperature.

(5) Continue cooling to 120° F. then add the perfume and color. The batch is complete when the temperature drops to 100°–105° F.

Example 3.—Cream

| | Percent |
|---|---|
| Magnesium aluminum silicate | 2.0 |
| Polyoxyethylene lauryl ethers | 3.5 |
| Acid stable glyceryl monostearate | 12 |
| Glycerin | 4 |
| Titanium Dioxide | 0.5 |
| Spermaceti | 2.0 |
| USP petrolatum liquid | 4.0 |
| Solution of Example 1 | 54.5 |
| Perfume, color, water, q.s. to | 100 |

(1) Disperse the magnesium aluminum silicate and glycerin in all the available water at 185° F. for 30 minutes.

(2) Heat the polyoxyethylene lauryl ethers, acid stable glyceryl monostearate, spermaceti, and liquid petrolatum to a homogeneous melt at 185° F.

(3) Add No. 2 to No. 1 slowly and agitate for 15 minutes at the emulsion temperature (185° F.) before starting to cool.

(4) Add solution of Example 1 at 130° F. and agitate for 20 minutes maintaining the temperature.

(5) Add the titanium dioxide at 130° F.

(6) Continue cooling to 120° F. then add the perfume and color. The batch is complete when the temperature drops to 100°–105° F.

In the following the procedure for the preparation of aqueous solutions of complexes set forth in Example 1 was used:

Example 4

| | Percent |
|---|---|
| Basic zirconyl chloride (10% as $ZrO_2$) | 12.5 |
| dl-Leucine | 2.5 |
| Triethylamine | 2.2 |
| Distilled water q.s. | 100 |

Description: A clear aqueous solution at pH 2.8.

Example 5

| | Percent |
|---|---|
| Basic zirconyl chloride (10% as $ZrO_2$) | 12.5 |
| dl-Phenylalanine | 2.0 |
| Propylenediamine | 0.8 |
| Distilled water q.s. | 100 |

Description: A clear aqueous solution at pH 2.8.

Example 6

| | Percent |
|---|---|
| Basic zirconyl chloride (10% as $ZrO_2$) | 12.5 |
| Buffered acetic acid | 2.5 |
| dl-Lysine | 2.5 |
| Distilled water q.s. | 100 |

Description: A clear aqueous solution at pH 3.5.

Example 7

| | Percent |
|---|---|
| Zirconium oxychloride (4% as $ZrO_2$) | 10 |
| Triethanolamine | 4.5 |
| Glycine | 2.5 |
| Distilled water q.s. | 100 |

Description: A clear aqueous solution at pH 3.4.

Example 8

| | Percent |
|---|---|
| Zirconium oxychloride (4% as $ZrO_2$) | 10 |
| dl-Methionine | 3.5 |
| Dimethylamine | 4.5 |
| Distilled water q.s. | 100 |

Description: A clear aqueous solution at pH 3.0.

Example 9

| | Percent |
|---|---|
| Zirconium oxychloride (4% as $ZrO_2$) | 10 |
| dl-Serine | 3 |
| Tetraethylenepentamine | 1 |
| Distilled water q.s. | 100 |

Description: A clear aqueous solution at pH 2.9.

Example 10

| | |
|---|---|
| Acetato zirconyl chloride (3.5% as $ZrO_2$) | 7 |
| Triethanolamine | 1.3 |
| dl-Glycine | 0.7 |
| Distilled water q.s. | 100 |

Description: A clear aqueous solution at pH 3.5.

Example 11

| | |
|---|---|
| Acetato zirconyl chloride (5% as $ZrO_2$) | 10 |
| dl-Valine | 1 |
| Propylenediamine | 0.5 |
| Distilled water q.s. | 100 |

Description: A clear aqueous solution at pH 3.5.

Example 12

| | |
|---|---|
| Acetato zirconyl chloride (5% as $ZrO_2$) | 10 |
| dl-Leucine | 1 |
| Dimethylamine | 0.5 |
| Distilled water q.s. | 100 |

Description: A clear aqueous solution at pH 3.2.

As noted above, it has been proposed in the prior art to prepare antiperspirant compositions containing a zirconium salt, together with a basic aluminum compound and an amino acid, such as glycine. It has been found, however, that compositions of this character have less antiperspirant activity than the compositions of the present invention. Thus, for example, a composition containing an Al/Zr ratio of 3:1 was prepared containing the following:

| | percent |
|---|---|
| Basic zirconium chloride (calculated as $ZrO_2$) | 7.5 |
| $Al(OH)_3$ | 4 |
| Glycine | 2.5 |

This composition was compared with equal concentrations of the composition of this invention illustrated in Example 1 above in a standard test to determine the relative antiperspirant activity of each composition. It was found that the zirconium composition of the present invention demonstrated 20–25% more inhibition of perspiration than the aluminum/zirconium composition set out above. This represents a 50% increase in activity.

Irritation studies on rabbits and humans indicate that the irritation potential of the zirconium compositions of this invention are zero to minimal. Its fabric damage, as measured by the Good Housekeeping Test (Bein, R. R. Proceedings of the Scientific Section of The Toilet Goods Association, number 4, December 6, 1945), was found to be none to minimal, usually running between 0–5%. Other typical antiperspirant compositions tested along with the present composition exhibited fabric damage potentials anywhere from 20–60%.

Although the invention has been described with reference to specific forms thereof, it will be understood that many changes and modifications may be made without departing from the spirit of this invention.

What is claimed is:

1. An antiperspirant composition comprising an aqueous carrier and a complex of formula:

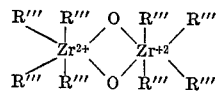

wherein $R'''$ is selected from the group consisting of (a) water, (b) a nucleophilic compound of the group consisting of propylenediamine, triethylamine, diethylamine, monoethylamine, tri-ethylenetetraamine; tetraethylpentamine, triisopropanolamine, 2-amino-1-methylpropanediol; trimethylolamine, triethanolamine, diethanolamine, monoethanolamine, thioethanolamine, thioglycolic acid; and (c) an amino acid of the group consisting of lysine, glycine, valine, leucine, methionine and N-phenylalanine at least one $R'''$ group being an amino acid compound and at least one other $R'''$ group being a nucleophilic compound.

2. A composition according to claim 1 wherein the aqueous carrier is a water solution.

3. A composition according to claim 1 wherein the aqueous carrier is a lotion.

4. A composition according to claim 1 wherein the aqueous carrier is a cream.

5. A composition according to claim 1 having a pH in the range of about .5 to 3.5.

6. A composition according to claim 1 wherein said complex is of formula:

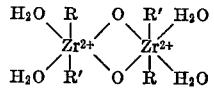

in which R is a nucleophilic compound as defined in claim 1 and R' is an amino acid as defined in claim 1.

7. A composition according to claim 6 wherein R is triethanolamine and R' is glycine.

8. A composition according to claim 6 having a pH in the range of about 2.0 to 3.5.

9. A composition according to claim 1 wherein said complex is present in equilibrium with the active ion species $(Zr=O(H_2O)_4)^{2+}$.

10. A method for inhibiting the flow of perspiration from living skin which comprises applying to said skin the composition of claim 1.

References Cited

UNITED STATES PATENTS 3,198,708  8/1965  Henkin et al. _____ 167—90

FOREIGN PATENTS 503,469  6/1954  Canada.

ALBERT T. MEYERS, *Primary Examiner*.

D. R. MAHANAND, *Assistant Examiner*.